(12) United States Patent
Welton et al.

(10) Patent No.: US 8,815,785 B2
(45) Date of Patent: Aug. 26, 2014

(54) UTILIZATION OF SURFACTANT AS CONFORMANCE MATERIALS

(75) Inventors: Thomas D. Welton, Duncan, OK (US); Bobby J. Burns, Duncan, OK (US)

(73) Assignee: Halliburton Energy Services, Inc., Houston, TX (US)

(*) Notice: Subject to any disclaimer, the term of this patent is extended or adjusted under 35 U.S.C. 154(b) by 439 days.

(21) Appl. No.: 12/322,000

(22) Filed: Jan. 28, 2009

(65) Prior Publication Data

US 2009/0143256 A1 Jun. 4, 2009

Related U.S. Application Data

(63) Continuation-in-part of application No. 11/647,605, filed on Dec. 29, 2006, now Pat. No. 7,718,584, and a continuation-in-part of application No. 11/647,743, filed on Dec. 29, 2006, now Pat. No. 7,997,342, and a continuation-in-part of application No. 11/648,441, filed on Dec. 29, 2006, now Pat. No. 7,939,471.

(51) Int. Cl.
| | | |
|---|---|---|
| *C09K 8/506* | (2006.01) | |
| *C09K 8/68* | (2006.01) | |
| *C09K 8/72* | (2006.01) | |

(52) U.S. Cl.
CPC . *C09K 8/506* (2013.01); *C09K 8/68* (2013.01); *C09K 2208/30* (2013.01); *C09K 8/72* (2013.01)
USPC .............................. 507/219; 166/295; 166/300

(58) Field of Classification Search
CPC ............ C09K 8/506; C09K 8/72; C09K 8/68; C09K 2208/30
See application file for complete search history.

(56) References Cited

U.S. PATENT DOCUMENTS

| | | |
|---|---|---|
| 3,333,634 A | 8/1967 | Townsend et al. |
| 3,410,343 A | 11/1968 | Abdo |
| 3,737,977 A | 6/1973 | Jorgensen |
| 3,866,685 A * | 2/1975 | Friedman ................ 166/294 |
| 4,525,285 A * | 6/1985 | Son et al. ................ 507/131 |
| 5,582,249 A | 12/1996 | Caveny et al. |
| 5,775,425 A | 7/1998 | Weaver et al. |
| 5,787,986 A | 8/1998 | Weaver et al. |
| 5,833,000 A | 11/1998 | Weaver et al. |
| 5,839,510 A | 11/1998 | Weaver et al. |
| 5,853,048 A | 12/1998 | Weaver et al. |

(Continued)

FOREIGN PATENT DOCUMENTS

| | | | |
|---|---|---|---|
| GB | 2 406 863 | 4/2005 | ............ E21B 33/138 |
| WO | WO2005040554 A1 | 5/2005 | |

OTHER PUBLICATIONS

ClearPAC HD Polymer-free fluid for high-density gravel pack, May 2005.

(Continued)

*Primary Examiner* — Alicia Bland
(74) *Attorney, Agent, or Firm* — McDermott Will & Emery LLP; Craig W. Roddy

(57) ABSTRACT

Methods for creating a fluid diverting barrier in a zone of a subterranean formation are provided. Certain methods comprise providing a treatment fluid that comprises an aqueous base fluid, a viscoelastic surfactant, and a soap component; placing the treatment fluid in a subterranean formation penetrated by a well bore; and allowing the soap component of the treatment fluid to interact with a metal ion present in the subterranean formation to form a precipitate.

11 Claims, 1 Drawing Sheet

(56) References Cited

U.S. PATENT DOCUMENTS

| | | | |
|---|---|---|---|
| 5,871,049 A | 2/1999 | Weaver et al. | |
| 5,879,699 A | 3/1999 | Lerner | 424/440 |
| 5,897,699 A | 4/1999 | Chatterji et al. | |
| 6,047,772 A | 4/2000 | Weaver et al. | |
| 6,063,738 A | 5/2000 | Chatterji et al. | 507/269 |
| 6,209,643 B1 | 4/2001 | Nguyen et al. | |
| 6,258,859 B1 * | 7/2001 | Dahayanake et al. | 516/77 |
| 6,419,017 B1 * | 7/2002 | Metcalf et al. | 166/295 |
| 6,439,309 B1 | 8/2002 | Matherly et al. | |
| 6,547,871 B2 | 4/2003 | Chatterji et al. | 106/672 |
| 6,637,517 B2 | 10/2003 | Samuel et al. | 166/381 |
| 6,881,702 B2 | 4/2005 | Arnold et al. | |
| 6,881,709 B2 | 4/2005 | Nelson et al. | |
| 7,159,659 B2 | 1/2007 | Welton et al. | 166/307 |
| 7,299,874 B2 | 11/2007 | Welton et al. | 166/307 |
| 7,303,019 B2 | 12/2007 | Welton et al. | 166/307 |
| 7,373,977 B1 | 5/2008 | Berger et al. | |
| 7,939,471 B2 | 5/2011 | Welton et al. | |
| 7,997,342 B2 | 8/2011 | Welton et al. | |
| 2004/0176478 A1 | 9/2004 | Dahayanake et al. | |
| 2005/0059558 A1 | 3/2005 | Blauch et al. | |
| 2005/0092489 A1 | 5/2005 | Welton et al. | |
| 2005/0107265 A1 | 5/2005 | Sullivan et al. | |
| 2005/0274517 A1 | 12/2005 | Blauch et al. | |
| 2006/0063681 A1 | 3/2006 | Christanti et al. | |
| 2006/0183646 A1 | 8/2006 | Welton et al. | 507/259 |
| 2006/0211775 A1 * | 9/2006 | Crews | 516/109 |
| 2006/0211776 A1 | 9/2006 | Crews | |
| 2007/0007010 A1 | 1/2007 | Welton et al. | |
| 2007/0213232 A1 | 9/2007 | Hartshorne et al. | |
| 2008/0011476 A1 | 1/2008 | Nguyen et al. | |
| 2008/0161207 A1 | 7/2008 | Welton et al. | |
| 2008/0161210 A1 | 7/2008 | Welton et al. | |
| 2008/0161212 A1 | 7/2008 | Welton | |
| 2009/0305913 A1 | 12/2009 | Welton | |

OTHER PUBLICATIONS

ClearPAC LT Polymer-free fluid for low-temperature gravel pack, May 2005.
ClearPAC MS Polymer-free fluid for simultaneous gravel packing and mudcake cleanup, May 2005.
ClearPAC A polymer-free gravel-packing fluid family for higher productivity, May 2005.
ClearFRAC Polymer-free fracturing fluids, Apr. 2005.
VDA Viscoelastic Diverting Fluid, Aug. 2002.
ClearFRAC CO2 Surfactant, Apr. 2005.
ClearFRAC EF Surfactant, Apr. 2005.
ClearFRAC HiPerm Polymer-free fracturing fluids for high-permeability reservoirs, Aug. 2005.
ClearFRAC HT Surfactant, Apr. 2005.
ClearFRAC Polymer-Free Fracturing Fluid, Apr. 2005.
Notice of Allowance and Notice of Allowability for U.S. Appl. No. 11/648,019 dated Sep. 9, 2009.
Notice of Allowance and Notice of Allowability for U.S. Appl. No. 11/648,019 dated Dec. 30, 2009.
Office Action for U.S. Appl. No. 11/647,743 dated Mar. 19, 2008.
Office Action for U.S. Appl. No. 11/647,743 dated Oct. 21, 2008.
Office Action for U.S. Appl. No. 11/647,743 dated Jun. 11, 2009.
Office Action for U.S. Appl. No. 11/647,743 dated Jan. 28, 2010.
Notice of Allowance and Notice of Allowability for U.S. Appl. No. 11/647,605 dated Dec. 28, 2009.
International Search Report and Written Opinion for PCT/GB2007/004710 dated Oct. 13, 2008.
Al-Ghamdi, AbdulWahab et al., "Impact of Acid Additives on the Rheological Properties of Viscoelastic Surfactants and Their Influence on Field Application," Society of Petroleum Engineers, SPE 89417, Apr. 17, 2004.
Notice of Allowance and Notice of Allowability from U.S. Appl. No. 11/647,605 dated Feb. 18, 2010.
Notice of Allowance and Notice of Allowability from U.S. Appl. No. 11/648,019 dated Feb. 24, 2010.
Office Action for U.S. Appl. No. 11/648,441 dated Mar. 25, 2010.
Office Action for U.S. Appl. No. 11/648,441, dated Jul. 10, 2009.
Notice of Allowance and Notice of Allowability for U.S. Appl. No. 11/647,605, dated Sep. 2, 2009.
Notice of Allowance and Notice of Allowability for U.S. Appl. No. 11/648,019, dated Sep. 9, 2009.
Office Action for U.S. Appl. No. 11/648,441 dated Oct. 15, 2010.
Office Action for U.S. Appl. No. 11/647,743 dated Nov. 30, 2010.
Notice of Allowance and Notice of Allowability for U.S. Patent Application No. 11/648,441 dated Mar. 11, 2011.
Office Action for U.S. Appl. No. 11/647,743 dated Feb. 22, 2011.
Notice of Allowance and Notice of Allowability for U.S. Appl. No. 11/647,743 dated Jun. 14, 2011.

* cited by examiner

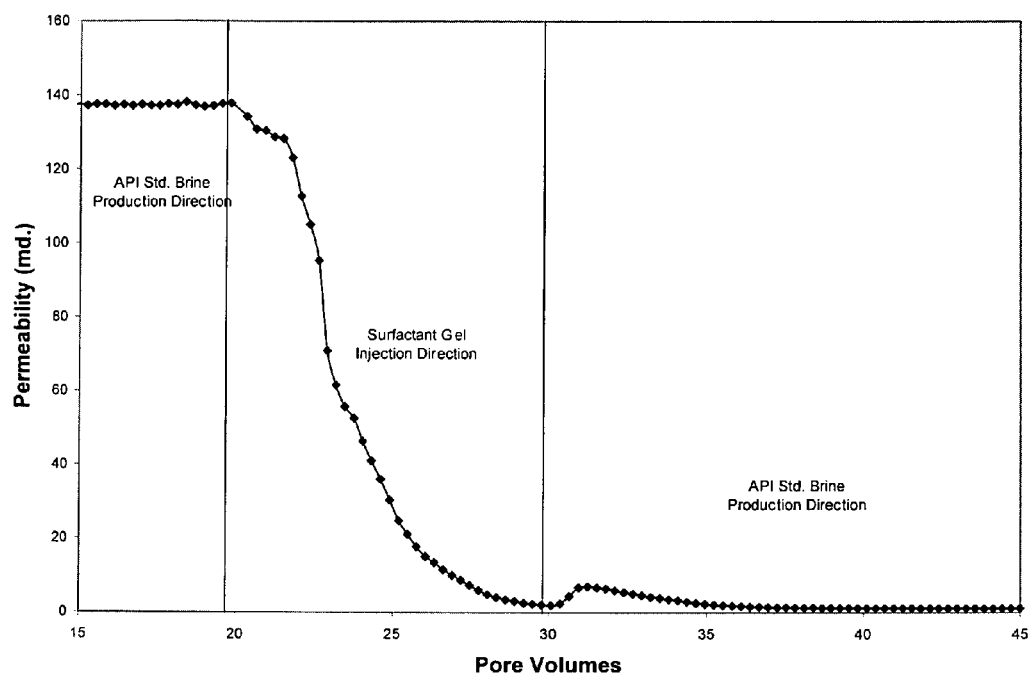

UTILIZATION OF SURFACTANT AS CONFORMANCE MATERIALS

CROSS-REFERENCE TO RELATED APPLICATIONS

The present application is a continuation-in-part of U.S. patent application Ser. No. 11/647,605, filed on Dec. 29, 2006 now U.S. Pat. No. 7,718,584, titled "Dual-Function Additives for Enhancing Fluid Loss Control and Stabilizing Viscoelastic Surfactant Fluids," the disclosure of which is incorporated herein by reference in its entirety. The present application is also a continuation-in-part of U.S. patent application Ser. No. 11/647,743 now U.S. Pat. No. 7,997,342 and Ser. No. 11/648,441 now U.S. Pat. No. 7,939,471, both filed on Dec. 29, 2006 and titled "Subterranean Treatment Fluids Comprising Viscoelastic Surfactant Gels," the disclosures of which are incorporated herein by reference in their entirety.

BACKGROUND

The invention generally relates to methods for treating a subterranean formation. More specifically, the invention relates to methods useful for creating a fluid diverting barrier in a zone of a subterranean formation. The methods may be useful in hydrocarbon wells and production methods.

When hydrocarbons are produced from wells that penetrate hydrocarbon producing formations, water often accompanies the hydrocarbons, particularly as the wells mature in time. The water can be the result of a water producing zone communicated with the hydrocarbon producing formations or zones by fractures, high permeability streaks and the like, or the water can be caused by a variety of other occurrences which are well known to those skilled in the art, such as water coning, water cresting, bottom water, channeling at the well bore, etc. As used herein, the term "zone" simply refers to a portion of the formation and does not imply a particular geological strata or composition. In addition, in enhanced recovery techniques such as water flooding, aqueous fluid is often injected under pressure into oil-containing subterranean formations by way of one or more injection wells. The flow of the aqueous fluid through the formations is intended to displace hydrocarbons contained therein and drive them to one or more producing wells. However, the aqueous displacement fluid often flows through the most permeable zones whereby less permeable zones containing hydrocarbons are bypassed. This uneven flow of the aqueous displacement fluid through the formations or zones reduces the overall yield of hydrocarbons. In any of the foregoing situations, it may be desirable to create a barrier to the flow of injected or natural drive fluid, e.g., aqueous or gas drive fluid, through high permeability channels and fractures in a subterranean formation. These methods are sometimes referred to in the art as "conformance control."

Another problem that may be encountered during subterranean operations is that treatment fluids introduced to a subterranean formation for the purpose of treating a portion of the subterranean formation may flow away from the zone that was intended to be treated via depleted zones, zones of relatively low pressure, naturally occurring fractures, weak zones having fracture gradients exceeded by the hydrostatic pressure of the drilling fluid, and so forth. As a result, the services provided by the treatment fluids are more difficult to achieve. Barriers to fluid flow through permeable zones of a subterranean formation may be desirable to prevent such a fluid loss.

An approach to preventing the unwanted movement of a fluid through a permeable zone of a subterranean formation has been to introduce a mixture of reagents, initially low in viscosity, into the zone of the formation that has high permeability. After a period of time sufficient to allow the mixture to be pumped into the subterranean formation, or when the mixture is exposed to the elevated temperature of the formation, the mixture of reagents may form a gel to at least partially block the flow of drive fluid. Some known techniques have involved injecting aqueous solutions of polymers and/or polymers with gelling agents into high permeability flow paths of a subterranean formation whereby the polymers are gelled and cross-linked therein. For example, water soluble polymers including copolymers of acrylamide and acrylic acid cross-linked with transition metal ions have been utilized heretofore. However, the use of resin and/or polymer conformance materials may not be economical in all applications. In addition, the use of some resins and/or polymers may raise environmental concerns.

An alternative method of reducing the movement of fluids through permeable zones of a subterranean formation has involved contacting a soap component with a salt to form a precipitate that serves as an at least partial barrier to fluid flow. The precipitates that form as a result of the interaction of a soap component and a salt may be substantially water insoluble. One obstacle that has frequently been encountered when using precipitates formed in this way is that soap components are typically regarded as water insoluble. Thus, different methods have been used to at least partially dissolve a soap component so that it may be introduced into a well bore and interact with a salt therein. One way in which soap components have been dissolved has been through the use of a non-aqueous solvent which is capable of dissolving a selected soap component. Another way in which soap components have been dissolved is to select soap components with relatively high solubility in an aqueous fluid, e.g., $\alpha$-branched carboxylic acids.

One conventional way of creating a precipitate from a soap component that has been at least partially dissolved and a salt solution has been to sequentially inject the at least partially dissolved soap component and a salt solution. These injections are commonly separated by an injection of a spacer fluid into the well bore. As used herein, "spacer" is defined as a fluid that prevents the soap component and the salt solution from interacting as they pass down the well bore and that is relatively inert with respect to the soap component and the salt solution. One drawback of sequentially injecting the soap component and the salt solution is the expense and time involved in pumping three separate substances downhole.

Another method that has been used to create a fluid diversion barrier is the injection of a treatment fluid comprising micelles that viscosify the treatment fluid, e.g., cause the treatment fluid form a gel. At a high level of viscosity, the treatment fluid may act as a fluid diversion barrier, diverting other treatment fluids away from high permeability zones. In some cases, additives comprising soap components have been included in treatment fluids to, inter alia, maintain the stability and/or viscosity of treatment fluids, particularly at temperatures above about 200° F., and to reduce the amount of the treatment fluid that is lost to the formation as filtrate.

SUMMARY

The invention generally relates to methods for treating a subterranean formation. More specifically, the invention relates to methods useful for creating a fluid diverting barrier in a zone of a subterranean formation. The methods may be useful in hydrocarbon wells and production methods.

In some embodiments, the present invention provides methods comprising providing a treatment fluid that comprises an aqueous base fluid, a viscoelastic surfactant, and a soap component; providing a brine that comprises a multivalent metal ion; placing the treatment fluid and the brine in a subterranean formation penetrated by a well bore, together or sequentially; and allowing the soap component and the multivalent metal ion to interact to form a precipitate in the subterranean formation.

In certain embodiments, the present invention provides methods comprising providing a treatment fluid that comprises an aqueous base fluid, a viscoelastic surfactant, a soap component, and a multivalent metal ion; placing the treatment fluid in a subterranean formation penetrated by a well bore; and allowing the soap component and a multivalent metal ion to interact to form a precipitate in the subterranean formation.

In some embodiments, the present invention provides methods comprising providing a treatment fluid that comprises an aqueous base fluid, a viscoelastic surfactant, and a soap component; placing the treatment fluid in a subterranean formation penetrated by a well bore; and allowing the soap component of the treatment fluid to interact with a metal ion present in the subterranean formation to form a precipitate.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

FIG. 1 illustrates data relevant to the permeability of one sample rock core treated according to one embodiment of the methods of the present invention.

DESCRIPTION OF PREFERRED EMBODIMENTS

The invention generally relates to methods for treating a subterranean formation. More specifically, the invention relates to methods useful for creating a fluid diverting barrier in a zone of a subterranean formation. The methods may be useful in hydrocarbon wells and production methods.

According to some embodiments, the present invention provides methods comprising providing a treatment fluid that comprises an aqueous base fluid, a viscoelastic surfactant, and a soap component; placing the treatment fluid in a subterranean formation penetrated by a well bore; and allowing the soap component to interact with a metal ion present in the subterranean formation to form a precipitate. As used herein, the term "treatment fluid" refers to any fluid that may be used in an subterranean application in conjunction with a desired function and/or for a desired purpose. The term "treatment" does not imply any particular action by the fluid or any component thereof.

In some embodiments, a precipitate formed from the interaction of a soap component and a metal ion may at least partially block certain flow paths in a subterranean formation, reducing the flow of fluids through the flow paths, especially the flow of aqueous fluids. Examples of the types of flow paths that may be at least partially blocked by the precipitate include natural or induced fractures, depleted zones, zones of relatively low pressure, weak zones having fracture gradients exceeded by the hydrostatic pressure of a fluid being used to service a well bore, and perforations formed by a perforating gun. In some embodiments, a precipitate formed from the interaction of a metal ion and a soap component may be soluble in certain hydrocarbons. In some embodiments, the precipitate that forms is a carboxylic acid salt that is substantially insoluble in water.

Of the many advantages of the various methods of the present invention, one advantage may be that in some embodiments, the treatment fluids of the present invention may provide more economical conformance control than some known techniques that use resins or polymers. Another advantage may be that in some embodiments, the viscoelastic surfactant used in the treatment fluid may dissolve at least a portion of a soap component present in the treatment fluid. Yet another advantage may be that in some embodiments, only one treatment fluid must be pumped downhole to create a fluid-diverting barrier, because a soap component that is at least partially dissolved in the treatment fluid may form a precipitate upon interacting with a metal ion already present in the subterranean formation. Still another potential advantage of some treatment fluids of the present invention may be that because some treatment fluids do not result in a substantial filter cake, the treatment fluid may penetrate the formation relatively deeply. Another potential advantage may be that in some embodiments, the fluid-diverting precipitate that forms in a subterranean formation may be reversible.

As used herein, the term "viscoelastic surfactant" refers to any surfactant that imparts or is capable of imparting viscoelastic behavior to a fluid due, at least in part, to the association of surfactant molecules to form viscosifying micelles. The viscoelastic surfactants useful in the methods of the present invention may comprise any viscoelastic surfactant known in the art, any derivative thereof, or any combination of the foregoing. These viscoelastic surfactants may be cationic, anionic, or amphoteric in nature. The viscoelastic surfactants may comprise any number of different compounds, including methyl ester sulfonates (e.g., as described in U.S. Pat. Nos. 7,299,874, 7,159,659, 7,303,019, and U.S. Publication Number 2006-0183646-A1 published Aug. 17, 2006, the entire disclosures of which are incorporated herein by reference), hydrolyzed keratin (e.g., as described in U.S. Pat. No. 6,547,871, the relevant disclosure of which is incorporated herein by reference), sulfosuccinates, taurates, amine oxides, ethoxylated amides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), betaines, modified betaines, alkylamidobetaines (e.g., cocoamidopropyl betaine), quaternary ammonium compounds (e.g., trimethyltallowammonium chloride, trimethylcocoammonium chloride), derivatives thereof, and combinations thereof.

Suitable viscoelastic surfactants may comprise mixtures of several different compounds, including but not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. Examples of suitable mixtures of an ethoxylated alcohol ether sulfate surfactant, an alkyl or alkene amidopropyl betaine surfactant, and an alkyl or alkene dimethylamine oxide surfactant are described in U.S. Pat. No. 6,063,738, the entire disclosure of which is incorporated herein by reference. Examples of suitable aqueous solutions of an alpha-olefinic sulfonate surfactant and a betaine surfactant are described in U.S. Pat. No. 5,879,699, the entire disclosure of which is incorporated herein by reference.

Examples of commercially-available viscoelastic surfactants suitable for use in the present invention may include, but are not limited to, Mirataine BET-O 30™ (an oleamidopropyl betaine surfactant available from Rhodia Inc., Cranbury, N.J.), Aromox APA-T (amine oxide surfactant available from Akzo Nobel Chemicals, Chicago, Ill.), Ethoquad O/12 PG™ (a fatty amine ethoxylate quat surfactant available from Akzo Nobel Chemicals, Chicago, Ill.), Ethomeen T/12™ (a fatty amine ethoxylate surfactant available from Akzo Nobel Chemicals, Chicago, Ill.), Ethomeen S/12™ (a fatty amine ethoxylate surfactant available from Akzo Nobel Chemicals, Chicago, Ill.), and Rewoteric AM TEG™ (a tallow dihydroxyethyl betaine amphoteric surfactant available from Degussa Corp., Parsippany, N.J.).

The viscoelastic surfactant should be present in a treatment fluid of the present invention in an amount sufficient to impart the desired viscosity (e.g., sufficient viscosity to divert flow, reduce fluid loss, suspend particulates, etc.) to the treatment fluid. In certain embodiments, the viscoelastic surfactant may be present in the treatment fluid in an amount in the range of from about 0.1% to about 20% by weight of the treatment fluid. In some embodiments, the viscoelastic surfactant may be present in an amount in the range of from about 1% to about 10% by weight of the treatment fluid. In some embodiments, the viscoelastic surfactant may be present in an amount in the range of from about 1.5% to about 5% by weight of the treatment fluid. In certain exemplary embodiments, the treatment fluids of the present invention are substantially free of non-aqueous solvents that are capable of dissolving the soap component of the treatment fluid.

As used herein, the term "soap component" refers to salts of carboxylic acids (which are referred to herein as "soaps"), free carboxylic acids, derivatives thereof, and combinations thereof. The soap components that are used in the present invention may comprise any soap or carboxylic acid known in the art, derivatives thereof, or combinations thereof. The term "derivative" is defined herein to include any compound that is made from one of the listed compounds, for example, by replacing one atom in one of the listed compounds with another atom or group of atoms, ionizing one of the listed compounds, or creating a salt of one of the listed compounds. In certain embodiments, the soap component may comprise a solution of one or more carboxylic acids in combination with one or more soaps or salts of carboxylic acids.

In conventional usage in the art, the term "soap" sometimes may be understood to include only the salts of "fatty acids" (i.e., "long-chain" carboxylic acids, a term that is defined herein to refer to carboxylic acids that comprise about 10-30 carbons). However, as used herein, the term "soap" refers to a salt of any carboxylic acid, regardless of the length of the hydrocarbon chain. Thus, for the purposes of this invention, the term "soap" includes salts of fatty acids that are conventionally referred to as soaps, and also includes the salts of non-long-chain carboxylic acids. Similarly, the carboxylic acids used as the soap component may comprise long-chain carboxylic acids (e.g., "fatty acids") or any other carboxylic acid known in the art. In some embodiments, the soap component may comprise long-chain carboxylic acids or the salts of long-chain carboxylic acids. Not wishing to be limited by theory, it is thought that the presence of a longer carbon chain may speed the formation of a precipitate.

Examples of soaps that may be suitable for use in a soap component of the present invention are non-branched soaps including, but not limited to, sodium stereate, potassium stereate, ammonium stereate, sodium oleate, potassium oleate, ammonium oleate, sodium laurate, potassium laurate, sodium myristate, potassium myristate, sodium ricinoleate, potassium ricinoleate, sodium palmitate, potassium palmitate, calcium caprylate, sodium caprylate, potassium caprylate, sodium behenate, potassium behenate, ammonium behenate, combinations thereof, and the like. Examples of carboxylic acids that may be suitable for use in the soap component include, but are not limited to, 4,7,10,13,16,19-docosahexaenoic acid, 4,7,10,13,16-docosapentaenoic acid, 5,8,11,14,17-eicosapentaenoic acid, 5,8,11,14-eicosatetraenoic acid, 5,8,11-eicosatrienoic acid, 6,9,12,15-octadecatetraenoic acid, 7,10,13,16,19-docosapentaenoic acid, 7,10,13,16-docosatetraenoic acid, 8,11,14,17-eicosatetraenoic acid, 8,11,14-eicosatrienoic acid, behenic acid, capric acid, caprylic acid, cis-11-docosenoic acid, cis-11-eicosenoic acid, cis-11-octadecenoic acid, cis-15-tetracosenoic acid, cis-4-decenoic acid, cis-4-dodecenoic acid, cis-4-tetradecenoic acid, cis-5-lauroleic acid, cis-5-tetradecenoic acid, cis-6-octadecenoic acid, cis-9-decenoic acid, cis-9-dodecenoic acid, cis-9-eicosenoic acid, cis-9-hexadecenoic acid, cis-9-tetradecenoic, cis-tetracosenoic acid, caprylic acid decenoic acid, dihydroxystearic acid, docosadienoic acid, docosahexaenoic acid, docosapentaenoic acid, dotriacontanoic acid, eicosadienoic acid, eicosanoic acid, eicosapentaenoic acid, eicosatetraenoic acid, eicosatrienoic acid, eicosenoic acid, erucic acid, heptadecanoic acid, heptadecenoic acid, hexacosanoic acid, hexadecadienoic acid, hexadecenoic acid, lauric acid, linoleic acid, linolenic, myristic acid, nonadecanoic acid, nonanoic acid, octacosanoic acid, octadecatetraenoic acid, octadecatrienoic acid, oleic acid, palmitic acid, pentadecanoic acid, pentadecenoic acid, pentatriacontanoic, ricinoleic acid, stearic acid, tetracosanoic acid, tetradecenoic acid, tetratriacontanoic acid, triacontanoic acid, tridecanoic acid, tritriacontanoic acid, combinations thereof, derivatives thereof, and the like.

In some embodiments, the soap or soap component also may be a combination of fatty acids made from numerous sources including but limited to animal fats, marine fats, vegetable oils and fats, butter, canola oil, castor oil, coco butter coconut oil, corn oil, cotton seed oil, crambe oil, herrings, lard, linseed oil, menhaden, olive oil, palm kernel oil, peanut oil, plam oil, rape seed oil, safflower oil, sardines, soybean oil, sunflower oil, tall oil, tallow, tung oil, yellow grease, combinations thereof, and the like.

Any combination of the soaps and/or carboxylic acids listed above also may be included in the treatment fluids of the present invention. The types of soaps and/or carboxylic acids suitable for use in a particular application of the present invention may depend upon a variety of factors, such as the type(s) of viscoelastic surfactant(s) present in the treatment fluid, the composition of the aqueous base fluid, the temperature of the fluid, and the like. A person of ordinary skill, with the benefit of this disclosure, will recognize the appropriate types of soaps and/or carboxylic acids to include in the soap component in a particular application of the present invention.

In some embodiments, the soap component may be present in any amount that is sufficient to produce at least the amount of precipitate necessary to accomplish the desired reduction in permeability in a subterranean zone. The amount of the soap component (in total, and the portion that is not dissolved) suitable for use in a particular application of the present invention may depend upon a variety of factors, such as the type(s) of viscoelastic surfactant(s) present in the treatment fluid, the composition of the aqueous base fluid, the temperature of the fluid, and the like. A person of ordinary skill in the art, with the benefit of this disclosure, will be able to determine the appropriate amount of the soap component to include in a particular application of the present invention. In some embodiments, the soap component may be present in an amount of about 2 pounds per thousand gallons of the treatment fluid or higher. In certain embodiments, the soap component may be present in an amount of about 15 pounds per thousand gallons of the treatment fluid or higher. In certain embodiments, the soap component may be present in an amount of about 40 pounds per thousand gallons of the treatment fluid or higher. In some embodiments, the amount of soap component present is in the range of from about 0.1% to about 5% by volume of the treatment fluid.

By way of explanation, in some embodiments the maximum amount of soap component that may be present in the treatment fluids is the amount of soap component that may be dissolved therein. Without wishing to be limited by theory, it is thought that the complete dissolution of the soap component allows for a greater portion of the soap component to penetrate the subterranean formation. Penetration of the subterranean formation by the soap component is desirable, because it increases the likelihood that the precipitate will form in the most permeable areas of the subterranean formation, e.g., the parts of the subterranean formation where conformance problems may be the most serious. In some embodiments, the maximum amount of the soap component that may be present in the treatment fluid may be limited by the amount that may be added without decreasing the viscosity of the gel to an undesirable level. In certain embodiments, the amount of the soap component present in the treatment fluid may depend on, inter alia, the maximum amount of the soap component that may be dissolved by the viscoelastic surfactant.

Aqueous base fluids that may be suitable for use in the methods of the present invention may comprise fresh water, saltwater (e.g., water containing one or more salts dissolved therein), brine, seawater, or combinations thereof. Generally, the water may be from any source, provided that it does not contain components that might adversely affect the stability and/or performance of the treatment fluids of the present invention. In certain embodiments, the density of the aqueous base fluid can be adjusted, among other purposes, to provide additional particle transport and suspension in the treatment fluids of the present invention. In certain embodiments, the pH of the aqueous base fluid may be adjusted (e.g., by a buffer or other pH adjusting agent), among other purposes, to reduce the viscosity of the treatment fluid (e.g., activate a breaker or other additive). In these embodiments, the pH may be adjusted to a specific level, which may depend on, among other factors, the type(s) of viscoelastic surfactant(s), soap component, gelling agents, acids, and other additives included in the treatment fluid. One of ordinary skill in the art, with the benefit of this disclosure, will recognize when such density and/or pH adjustments are appropriate.

In certain embodiments, at some point during the methods of the present invention (e.g., before a treatment fluid comprising a viscoelastic surfactant and a soap component is introduced into a subterranean formation), at least a portion of the soap component is dissolved by the viscoelastic surfactant in the treatment fluid. In some exemplary embodiments, substantially all of the soap component in the treatment fluid may be allowed to dissipate and/or dissolve into the viscoelastic surfactant at some point in time during the methods of the present invention. As used herein, a portion of the soap component that is not dissolved by the viscoelastic surfactant may be present in the treatment fluid as a separate phase (e.g., a solid phase).

In some embodiments, the precipitate formed by the interaction of a soap component with a metal ion may be a solid, a waxy solid, or a gum. The consistency of the precipitate may depend on several factors, including, but not limited to, the temperature of the subterranean formation and the soap component utilized in the treatment fluid. In preferred embodiments the precipitate forms a water insoluble barrier capable of diverting subsequently introduced treatment fluids. In some embodiments, the precipitate may be relatively permanent in the conditions of the subterranean formation. In certain embodiments, the precipitate may be dissolved by contacting the precipitate with an acid and/or a chelating agent. The metal ion that causes a precipitate to form upon interacting with a soap component present in a treatment fluid is typically a multivalent metal ion. Some exemplary metal ions that may interact with a soap component to form a precipitate are $Mg^{2+}$ and $Ca^{2+}$. In some embodiments, the metal ion is a cation that may be naturally present in a formation brine that comprises an alkaline earth metal salt, e.g. a calcium chloride or magnesium chloride brine.

The treatment fluids used in the methods of the present invention optionally may comprise any number of additional additives, including, but not limited to, salts, co-surfactants, acids, additional fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, dispersants, flocculants, $H_2S$ scavengers, $CO_2$ scavengers, oxygen scavengers, lubricants, viscosifiers, breakers, weighting agents, relative permeability modifiers, resins, particulate materials (e.g., proppant particulates), wetting agents, coating enhancement agents, and the like. A person skilled in the art, with the benefit of this disclosure, will recognize the types of additives that may be included in the treatment fluids for a particular application.

For example, the treatment fluids of the present invention optionally may comprise one or more salts, among other purposes, to modify the rheological properties (e.g., viscosity) of the treatment fluid. The salts may be organic or inorganic. Examples of suitable organic salts include but are not limited to aromatic sulfonates and carboxylates (such as p-toluene sulfonate, naphthalene sulfonate), hydroxynaphthalene carboxylates, salicylate, phthalate, chlorobenzoic acid, salicylic acid, phthalic acid, 5-hydroxy-1-naphthoic acid, 6-hydroxy-1-naphthoic acid, 7-hydroxy-1-naphthoic acid, 1-hydroxy-2-naphthoic acid, 3-hydroxy-2-naphthoic acid, 5-hydroxy-2-naphthoic acid, 7-hydroxy-2-naphthoic acid, 1,3-dihydroxy-2-naphthoic acid, 3,4-dichlorobenzoate, trimethylammonium hydrochloride and tetramethylammonium chloride. Examples of suitable inorganic salts include water-soluble potassium, sodium, and ammonium salts, (such as sodium chloride, potassium chloride, and ammonium chloride), and the like. Typically, salts that comprise a multivalent metal ion that is capable of forming a precipitate with the soap component are not included in the treatment fluid. Examples of such salts include calcium chloride, calcium bromide, magnesium chloride and zinc halide salts. In certain embodiments, salts that comprise a multivalent metal ion capable of forming a precipitate with the soap component may be introduced to the subterranean formation before, after, or between the introduction of a treatment fluid or treatment fluids comprising the soap component. However, in some cases, such salts may be included in the treatment fluid. Examples of treatment fluids comprising salts suitable for use in the present invention are described in U.S. patent application Ser. No. 10/800,478, the entire disclosure of which is incorporated herein by reference. Any combination of the salts listed above also may be included in the treatment fluids of the present invention.

When used, the salt may be present in any amount that imparts the desired stability and/or other rheological properties to a treatment fluid of the present invention. In certain embodiments, the salt may be present in an amount in the range of from about 0.1% to about 30% by weight of the treatment fluid. In certain embodiments, the salt may be present in an amount in the range of from about 0.1% to about 10% by weight of the treatment fluid. The type(s) and amount of salts suitable in a particular application of the present invention may depend upon a variety of factors, such as the type(s) of viscoelastic surfactant(s) present in the treatment fluid, the composition of the aqueous-base fluid, the composition and/or amount of the soap component, the temperature of the fluid, and the like. A person of ordinary skill, with the benefit of this disclosure, will recognize when to include a salt in a particular application of the present invention, as well as the appropriate type and amount of salts to include.

The methods of the present invention may be used prior to, during, or subsequent to a variety of subterranean operations known in the art. For example, it will be understood by those skilled in the art that the methods of the present invention can be used together with stimulation treatments, ahead of stimulation treatments, or after stimulation treatments. Examples of stimulation treatments include, but are not limited to drilling operations, pre-pad treatments, fracturing operations, perforation operations, preflush treatments, afterflush treatments, sand control treatments (e.g., gravel packing), acidizing treatments (e.g., matrix acidizing or fracture acidizing), "frac-pack" treatments, cementing treatments, and well bore clean-out treatments. In addition, the treatment fluids of the present invention may also be used in conjunction with treatments that reduce friction, as a spacer fluid, insulation fluid, as a diverter, as a fluid loss pill, as part of a drilling fluid, as a chemical pig in a well bore, or as a chemical pig in a pipeline. In some embodiments, the treatment fluid may also comprise a cement slurry.

In some embodiments, the methods of the present invention are used during matrix treatments or in preparation for other matrix treatments. As used herein, the term "matrix treatment" refers to the introduction of a treatment fluid into a subterranean formation at a rate and pressure below the pressure sufficient to create a fracture in the formation. For example, in the case of an acid matrix treatment (i.e., matrix acidizing), the disclosed treatment fluid can be included ahead of an aqueous acid treatment, in the aqueous acid treatment, or both, and the treatment fluid is typically introduced at a rate and pressure below the pressure sufficient to create or enhance a fracture in the formation. The precipitate that results from the interaction of a metal ion with a treatment fluid comprising a viscoelastic surfactant and a soap component may diver an aqueous acid treatment to a desired zone of a subterranean formation, e.g., a less permeable zone. Then, the acid in the aqueous acid treatment may permeate into channels and dissolve materials that clog or constrict the channels, thereby increasing permeability of the formation. Thus, an increase in permeability is affected primarily by the reaction of the acid within the formation, and little or no permeability increase is due to induced fractures within the formation.

In some embodiments of the methods of the present invention in which a precipitate has been formed that at least partially blocks the flow of fluids through a portion of a subterranean formation, it may become desirable to later remove some or all of the precipitate. Because a precipitate formed through the interaction of a metal ion with a treatment fluid comprising a viscoelastic surfactant and a soap component may be substantially water insoluble, the removal of such a barrier may in some cases be accomplished through the use of mechanical displacement by a fluid that is subsequently injected into the subterranean formation. In some embodiments the intended function of the well may make it desirable to remove a precipitate by mechanical displacement. For example, in some embodiments in which a well is to be converted from a producer well into an injection well, it may be desirable to remove an existing precipitate. Alternatively, in some embodiments in which it may be desirable to remove some or all of the precipitate, a hydrocarbon that is capable of dissolving the precipitate may be provided. In some embodiments, a hydrocarbon that is capable of dissolving the precipitate may be naturally present in a subterranean formation.

In some embodiments, the treatment fluids of the present invention and/or any component thereof may be prepared at a job site, or they may be prepared at a plant or facility prior to use, and may be stored for some period of time prior to use. In certain embodiments, the preparation of the treatment fluids of the present invention may be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

To facilitate a better understanding of the present invention, the following examples of certain aspects of some embodiments are given. In no way should the following examples be read to limit, or define, the entire scope of the invention.

EXAMPLE

To assess the ability of a formation to regain permeability after in situ formation of a precipitate according to certain embodiments of the present invention, a permeability regain test was performed in an experimental Berea sandstone core. The Berea sandstone core that was used had a length of about 6.984 cm and a diameter of about 2.521 cm. The experiment was conducted at an ambient temperature of 150° F. First, standard API brine was flowed through the sandstone core in the production direction at a flow rate of about 2 mL per minute until a baseline permeability was established. Then, 10 pour volumes of treatment fluid containing 1.5% betaine by volume of the fluid and 0.5% sodium oleate by weight of the fluid in a 5% KCL solution was flowed through the core in the injection direction. To determine whether the formation would regain the permeability lost after the introduction of the treatment fluid, 15 pour volumes were flowed through the formation in the production direction. As seen in FIG. 1, less than 1% of the lost permeability was restored.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method comprising:
   providing a treatment fluid that comprises an aqueous base fluid, a viscoelastic surfactant, and a soap component;
   wherein the viscoelastic surfactant and the soap component are selected such that the viscoelastic surfactant dissolves substantially all of the soap component and a maximum amount of the soap component is dissolved in the viscoelastic surfactant without adversely affecting a target viscosity of the treatment fluid and any portion of the soap component that is not dissolved in the viscoelastic surfactant is present in the treatment fluid in a solid phase;
   wherein the soap component is present in the treatment fluid in an amount in the range of about 1% to about 5% by volume of the treatment fluid;
   wherein the soap component is selected from the group consisting of 4,7,10,13,16,19-docosahexaenoic acid; 4,7,10,13,16-docosapentaenoic acid; 5,8,11,14,17-eicosapentaenoic acid; 7,10,13,16,19-docosapentaenoic acid; and any combinations thereof; and
   wherein the treatment fluid is substantially free of a non-aqueous solvent capable of dissolving the soap component; and
   placing an amount of the treatment fluid in a subterranean formation penetrated by a well bore to create a fluid diverting barrier sufficient to provide conformance control;
   wherein the soap component of the treatment fluid interacts with a metal ion present in the subterranean formation to form a precipitate wherein the precipitate reduces the permeability of at least a portion of the subterranean formation to an aqueous fluid, a gas, or a combination thereof.

2. The method of claim 1 wherein the metal ion comprises at least one multivalent metal ion selected from the group consisting of $Ca^{2+}$ and $Mg^{2+}$.

3. The method of claim 1 wherein the viscoelastic surfactant is present in the treatment fluid in an amount in the range of about 0.1% to about 20% by weight of the treatment fluid.

4. The method of claim 2 wherein the treatment fluid comprises the multivalent metal ion as a cation of a salt present in the treatment fluid in an amount in the range of about 0.1% to about 10% by weight of the treatment fluid.

5. A method comprising:
   providing a treatment fluid that comprises an aqueous base fluid, a viscoelastic surfactant, a soap component, and a multivalent metal ion;
   wherein the viscoelastic surfactant and the soap component are selected such that the viscoelastic surfactant dissolves substantially all of the soap component and a maximum amount of the soap component is dissolved in the viscoelastic surfactant without adversely affecting a target viscosity of the treatment fluid and any portion of the soap component that is not dissolved in the viscoelastic surfactant is present in the treatment fluid in a solid phase;
   wherein the soap component is present in the treatment fluid in an amount in the range of about 1% to about 5% by volume of the treatment fluid;
   wherein the soap component is selected from the group consisting of 4,7,10,13,16,19-docosahexaenoic acid; 4,7,10,13,16-docosapentaenoic acid; 5,8,11,14,17-eicosapentaenoic acid; 7,10,13,16,19-docosapentaenoic acid; any combinations thereof; and
   wherein the treatment fluid is substantially free of a non-aqueous solvent capable of dissolving the soap component; and
   placing an amount of the treatment fluid in a subterranean formation penetrated by a well bore to create a fluid diverting barrier sufficient to provide conformance control;
   wherein the soap component and the multivalent metal ion interact to form a precipitate in the subterranean formation wherein the precipitate reduces the permeability of at least a portion of the subterranean formation to an aqueous fluid, a gas or a combination thereof.

6. The method of claim 5 wherein the metal ion comprises at least one multivalent metal ion selected from the group consisting of $Ca^{2+}$ and $Mg^{2+}$.

7. The method of claim 5 wherein the viscoelastic surfactant is present in the treatment fluid in an amount in the range of about 0.1% to about 20% by weight of the treatment fluid.

8. The method of claim 6 wherein the multivalent metal ion present in the treatment fluid is present as a cation of a salt present in the treatment fluid in an amount in the range of about 0.1% to about 10% by weight of the treatment fluid.

9. A method comprising:
   providing a treatment fluid that comprises an aqueous base fluid, a viscoelastic surfactant, and a soap component;
   wherein the viscoelastic surfactant and the soap component are selected such that the viscoelastic surfactant dissolves substantially all of the soap component and a maximum amount of the soap component is dissolved in the viscoelastic surfactant without adversely affecting a target viscosity of the treatment fluid and any portion of the soap component that is not dissolved in the viscoelastic surfactant is present in the treatment fluid in a solid phase;
   wherein the soap component is present in the treatment fluid in an amount in the range of about 1% to about 5% by volume of the treatment fluid;
   wherein the soap component is selected from the group consisting of 4,7,10,13,16,19-docosahexaenoic acid; 4,7,10,13,16-docosapentaenoic acid; 5,8,11,14,17-eicosapentaenoic acid; 7,10,13,16,19-docosapentaenoic acid; any combinations thereof; and
   wherein the treatment fluid is substantially free of a non-aqueous solvent capable of dissolving the soap component;
   providing a brine that comprises a multivalent metal ion; and
   placing an amount of the treatment fluid and the brine in a subterranean formation penetrated by a well bore, together or sequentially, to create a fluid diverting barrier sufficient to provide conformance control;

wherein the soap component and the multivalent metal ion interact to form a precipitate in the subterranean formation wherein the precipitate reduces the permeability of at least a portion of the subterranean formation to an aqueous fluid, a gas, or a combination thereof.

10. The method of claim 9 wherein the metal ion comprises at least one multivalent metal ion selected from the group consisting of $Ca^{2+}$ and $Mg^{2+}$.

11. The method of claim 9 wherein the viscoelastic surfactant is present in the treatment fluid in an amount in the range of about 0.1% to about 20% by weight of the treatment fluid.

* * * * *